July 6, 1954
W. F. MILLER ET AL
2,682,740
MULTIROTOR MOWER
Filed May 18, 1951
3 Sheets-Sheet 1
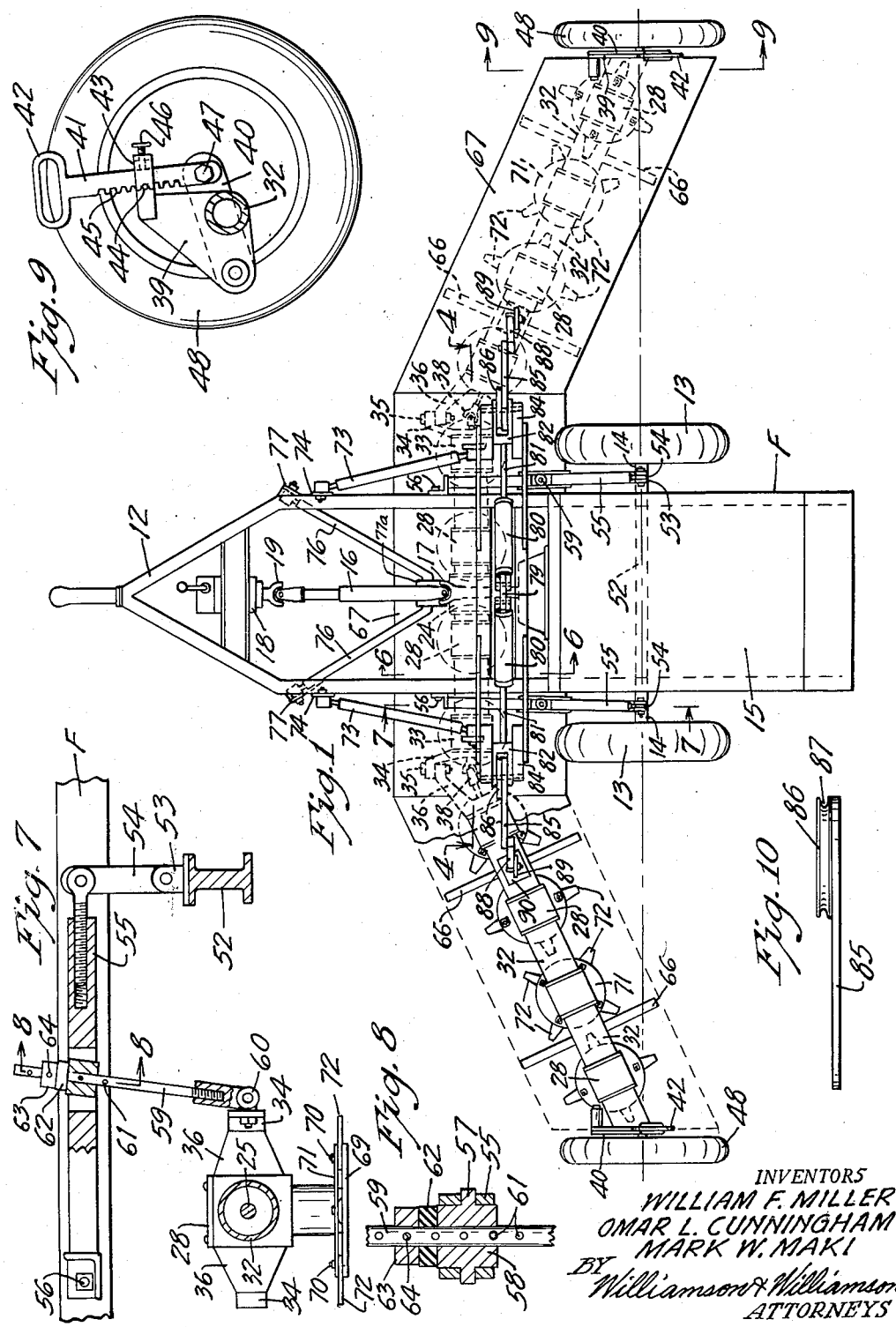
INVENTORS
WILLIAM F. MILLER
OMAR L. CUNNINGHAM
MARK W. MAKI
BY Williamson & Williamson
ATTORNEYS July 6, 1954
W. F. MILLER ET AL
2,682,740
MULTIROTOR MOWER
Filed May 18, 1951
3 Sheets-Sheet 2
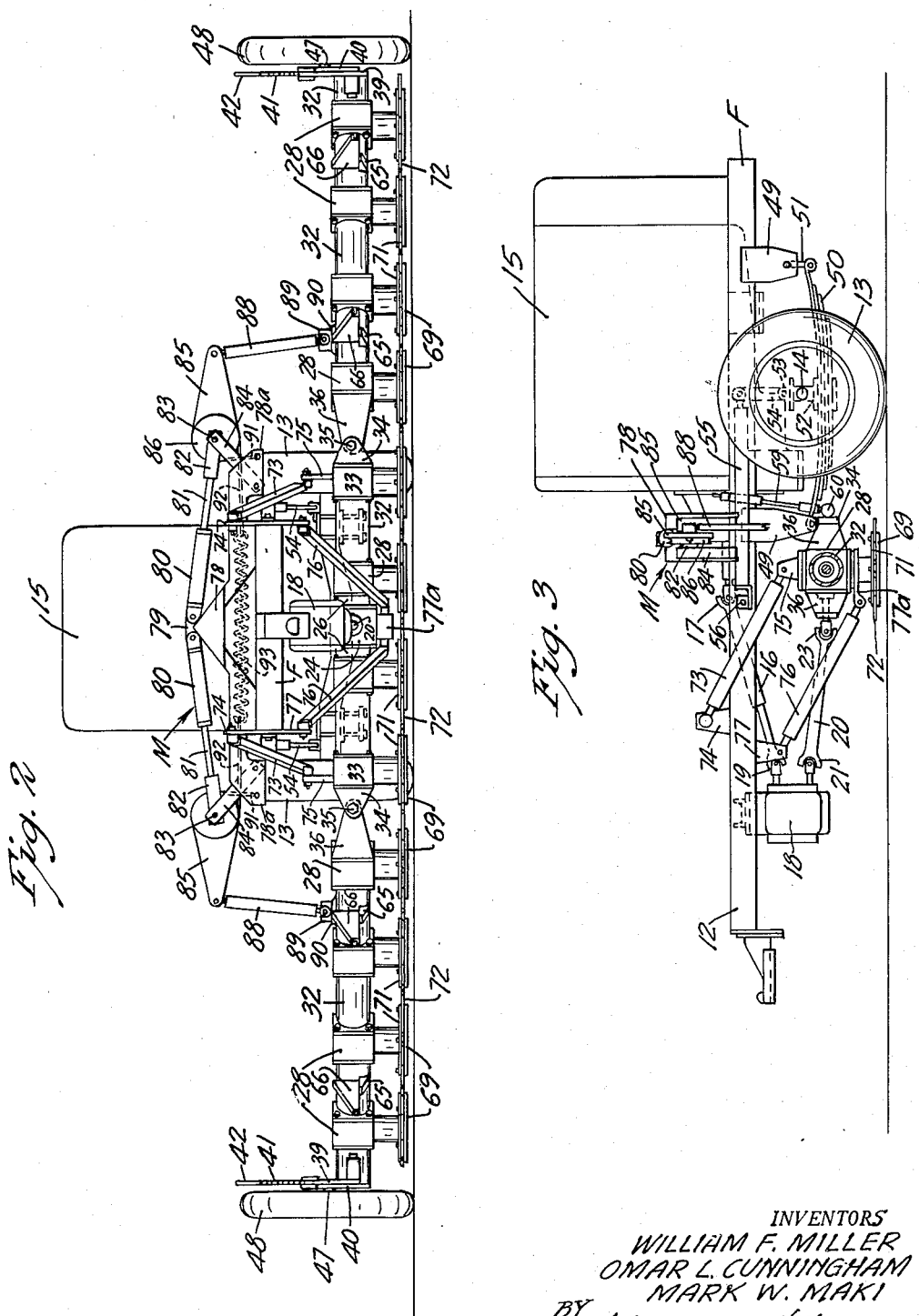
INVENTORS
WILLIAM F. MILLER
OMAR L. CUNNINGHAM
MARK W. MAKI
BY Williamson & Williamson
ATTORNEYS

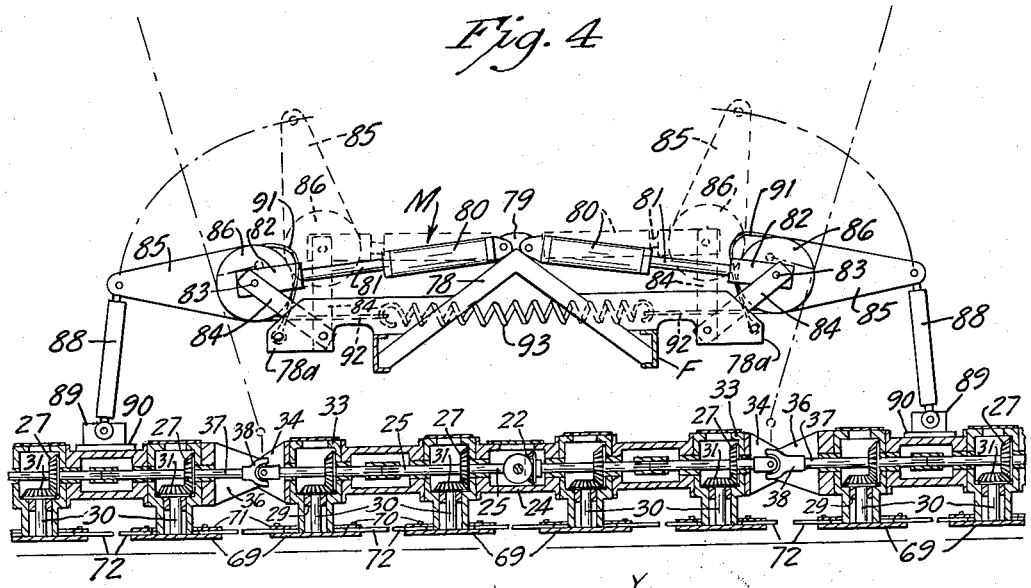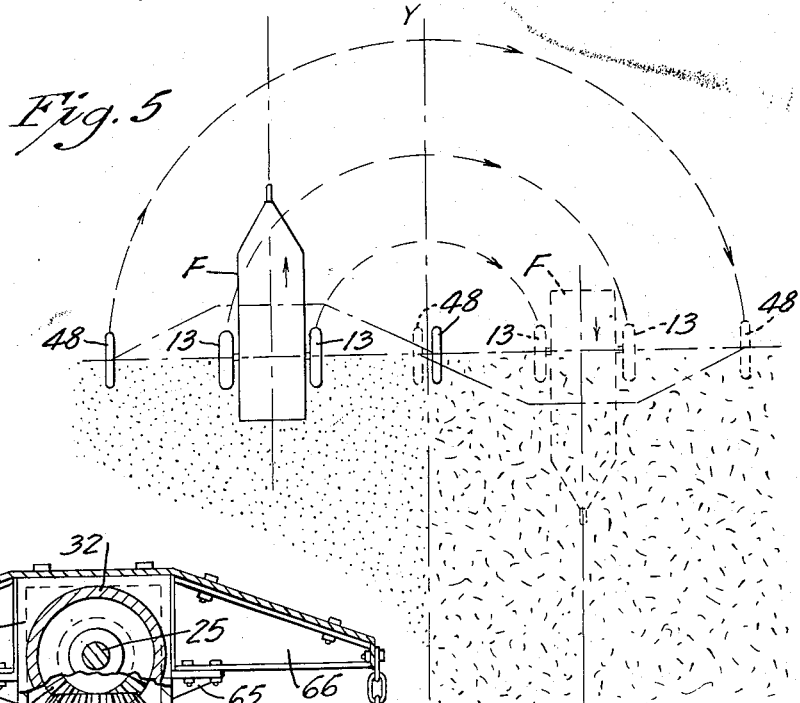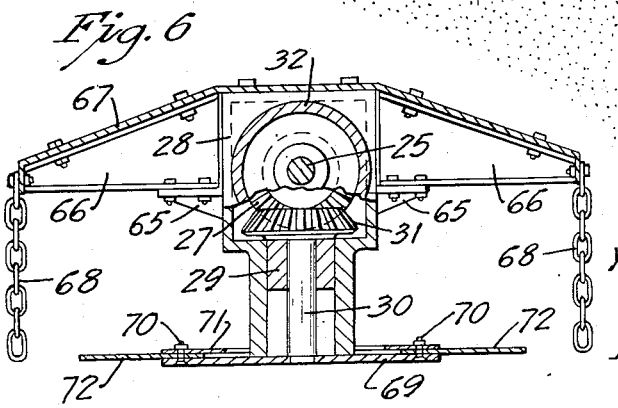

Patented July 6, 1954

2,682,740

UNITED STATES PATENT OFFICE

2,682,740

MULTIROTOR MOWER

William F. Miller, Omar L. Cunningham, and Mark W. Maki, Minneapolis, Minn., assignors to Toro Manufacturing Corporation of Minnesota, Minneapolis, Minn., a corporation of Minnesota Application May 18, 1951, Serial No. 227,064

19 Claims. (Cl. 56—6)

This invention relates to rotary mowers. More particularly it relates to rotary mowers constructed for wide-swathed mowing generally at relatively high speeds and wherein 180° turns are made at the end of the area being mown.

Current requirements in mowing large areas such as air ports, golf courses, and the like specify that a rotary mower, utilized for such areas, should be capable of executing a 180° turn without skipping or leaving any unmown area between the adjacent swathes in the vicinity where the turning operation takes place. Such a rotary mower should, for efficient operation, be capable of cutting a wide swathe and of being operated at high speeds. It is imperative that there be no skidding of the weight-bearing wheels during such a turning operation to prevent the sod or turf from being torn and damaged. It is equally important that some means be provided to prevent serious bouncing of the mower while passing over relatively rough terrain at high speed. It is also imperative that some means be provided for either quickly substituting other blades for cutting blades which have become dulled or for preventing such blades from becoming dull to thereby minimize the loss of time required for changing blades. Our invention is directed toward a satisfactory solution of these problems. The invention disclosed and not claimed herein is also disclosed in my divisional application No. 227,442, filed May 21, 1951, and entitled, "Elevating and Depressing Mechanism for Mowers and the Like" and are claimed therein.

It is a general object of our invention to provide a novel and improved rotary mower of relatively simple construction and of increased efficiency when in operation.

A more specific object is to provide a novel and improved mower utilizing a plurality of rotary cutter units mounted on spaced vertical axis and capable of completing a 180° turn without skipping any of the grass between swathes and without lateral skidding of the wheels with consequent injury to the mown surface and with excessive wear upon the tires.

Another object is to provide a rotary mower having a plurality of rotary cutter units mounted in a sweep arrangement to cut a continuous swathe the ends of which meet the axis of the wheel structure upon which the mower turns and the main portion of which extends or lies to one side of such axis.

Another object is to provide a rotary mower having the axis of each of the supporting wheels arranged to lie in the same vertical plane to prevent skipping and skidding during turning operations.

Another object is to provide a rotary mower constructed to float with the contour of the surface to be mowed and to reduce substantially the variations in elevation of its rotary cutter units which are normally experienced with the passage of its support wheels over uneven terrain.

Another object is to provide improved bracing structure for such floating rotary cutter units to maintain the knives in proper horizontal position despite substantial variations in elevation of the same caused by passing over rough terrain.

Another object is to provide a rotary mower having a plurality of rotary cutter unit assemblies capable of ready vertical adjustment with respect to the surface to be mowed.

These and other objects and advantages of my invention will be more apparent from the following description made in connection with the accompanying drawings, wherein like reference characters refer to similar parts throughout the several views and in which:

Fig. 1 is a top plan view of our invention with a portion of the cowl broken away from one of the lateral cutter unit assemblies.

Fig. 2 is a front elevational view of the same with the cowl and protective guard removed to more clearly show the respective cutter units.

Fig. 3 is a side elevational view of our invention with the lateral extending assemblies broken away to more clearly show the relation between the remaining parts.

Fig. 4 is a front elevational view taken approximately along line 4—4 of Fig. 1.

Fig. 5 is a diagrammatic view showing the exact path followed by the supporting structure for an embodiment of our invention in executing a 180° turn without skipping or skidding.

Fig. 6 is a vertical sectional view with parts broken away taken approximately along line 6—6 of Fig. 1.

Fig. 7 is an elevational view with parts in section taken approximately along line 7—7 of Fig. 1 with the necessary parts broken away to provide such a view.

Fig. 8 is a sectional view taken along line 8—8 of Fig. 7.

Fig. 9 is an elevational view with parts in section taken approximately along line 9—9 of Fig. 1.

Fig. 10 is an elevational view showing the details of and the relation between the lever arm of the elevating mechanism and its disc or drum.

One embodiment of our invention may include, as seen in Figs. 1–10, an ambulant frame indicated generally as F, the forward end 12 of which may be supported by a tractor or other propelling device and the rearward end of which may be supported by wheels 13 mounted on an axle 14 which extends transversely to the frame F and to the direction of its movement. If desired, of course, the frame F may be provided with a propelling mechanism of its own and in that event a set of wheels adjacent the forward end thereof would normally be required.

As shown, a motor 15 is mounted upon the ambulant frame F to provide a source of rotary power. A primary drive shaft 16 is connected to the motor 15 by universal joint 17 and to transmission gears (not shown) in a transmission housing 18 by a second universal joint 19. These transmission gears (not shown) are constructed and arranged to step up the speed of the rotary motion created by the motor 15 and to make possible a reversal in the direction thereof. A secondary drive shaft 20 is likewise connected to these transmission gears by a universal joint 21 and to bevel gears 22 by a fourth universal joint 23. As best shown in Fig. 4 these bevel gears 22 are housed in a gear box 24 which is disposed directly beneath the frame F. These bevel gears 22 cooperate with another set of bevel gears (not shown) which are mounted on a horizontal and transversely extending splined shaft 25.

The splined shaft 25 extends laterally in both directions through the sides of the gear box 24 which are open for that purpose. This shaft is made in sections each section being splined to another section to increase the length of the shaft. Rigidly connected to each of the sides of the gear box 24 is a short segment of housing 26. The splined shaft 25 extends through the central portions of these housing segments 26 and carries bevel gears 27 at regular intervals along its length. Each of these bevel gears 27 is disposed within a gear box 28. The lower portion of each gear box 28 is constructed to provide a journal 29 for a vertically extending and depending shaft 30 which carries a horizontally arranged bevel gear 31 in position to cooperate with the bevel gear 27. Each gear box 28 is open at both its sides and is adapted thereat to be removably connected to relatively long housing segments 32. These housing segments 32 carry the splined shaft 25 and serve to support the next gear box 28 which may be connected to the outer end thereof.

As best shown in Fig. 2 a gear box 33 is rigidly connected to the outer end of the longer housing segments 32. This gear box 33 is formed quite similarly to the gear boxes 28 but is provided with an outwardly extending bracket 34 on its outer side. As best shown in Fig. 1 this bracket 34 is provided with a pair of pivot rods 35 at the ends of each of its arms.

Pivotally mounted on the pivot rods 35 is an angled pivot bracket 36. As best seen in Fig. 1 the angle of this pivot bracket 36 is such as to cause additional gear boxes 28 and housings 32 which may be connected thereto to extend rearwardly with respect to the frame F. The bracket 34 and the pivot rods 35 are arranged so that the angled pivot bracket 36 is mounted for swinging movement on a horizontal axis extending longitudinally of the frame F and in the general direction of movement of that frame. The splined shaft 25 is connected in driving relation to a similarly splined shaft 37 by a universal joint 38. It can be readily seen that a gear box 28 may be rigidly connected to the outer end of the angled bracket 36 and that a housing 32 may be connected to the outer side of such gear box and that additional boxes and housings 32 may be connected in alternating sequence until the length of such an assembly is as great as may be desired. Each of these gear boxes 28 has a vertical shaft 30 mounted for rotation and each is adapted to be connected to such a housing 32. By referring to Fig. 1 it can readily be seen that this results in a sweep back arrangement with respect to the frame F.

The final or outermost housing 32 has a right triangled plate 39 secured to its outer side by welding or some other suitable means. A link 40, as best shown in Fig. 9 is pivotally connected to the forwardmost corner of this plate 39 and extends rearwardly therefrom. A ratchet arm 41 with a handle 42 extends upwardly from the rear end of the link 40 to which it is pivotally connected and passes through a guide member 43 which has a slot therein for that purpose. This guide member 43 is welded to the upper corner of the plate 39 and has a transversely extending pin 44 extending therethrough to cooperate with the teeth 45 of the ratchet arm 41. The set screw 46 extends inwardly through the guide member 43 and into its slot to abut against the rear of the ratchet arm 41. An axle 47 is mounted on the outer side of the rear end of the link 40 and carries a supporting wheel 48 on the outer end thereof.

Mounted on the ambulant frame F and depending therefrom are four mounting plates 49 each of which is mounted on the opposite sides of the frame in longitudinally spaced relation. Pivotally connected to the lower portions of each of the forwardmost two of these plates 49 is a spring 50. The rear end of each of the springs 50 is connected to its respective rear plate 49 by a link 51 for swinging movement therebetween. The medial portion of the axle 14 is constructed in the shape of an I beam, as best shown at 52 in Fig. 3. This I beam is rigidly connected to the spring 50 by clamps or other suitable means. Thus the entire frame F is supported by the wheels 13, its axle 14, the springs 50 and their mounting plates 49. Formed on the upper surface of the I beam adjacent each side of the frame F is an upstanding bracket 53 which is pivotally connected by a link 54 to the rear end of a lever arm 55 as best shown in Fig. 7. The forward end of the lever arm 55 is pivotally mounted on the frame F as at 56.

Pivotally mounted within the interior of the lever arm 55 by means of a pair of ears 57 is a pivot block 58. The ears 57 are arranged so that the pivot block will pivot on a substantially horizontal and transverse axis with respect to the frame F. A suspension arm 59 is pivotally connected at its lower end as at 60 to the housing directly below and extends upwardly through the pivot block 58 a substantial distance. Spacing holes 61 are formed in the upper portion thereof. A rubber bumper or cushion 62 and a collar 63 are slid over the upper end of the suspension arm 59 as shown in Fig. 7 and a lock pin 64 is provided to lock the collar to the suspension arm in the spacing holes selected for that purpose. Formed integrally with some of the housings 32 is an upfacing bracket 65. As best shown in Fig. 6 triangularly shaped support arms 66 may be secured to these brackets. Secured to the support arms in superimposed relation is a cowl 67 which extends throughout the length of the cutter assemblies. Depending from the forward and rearward edge of the cowl 67 are a plurality of closely spaced lengths of chain 68 which extend to a point a short distance above the surface to be mowed.

Removably secured to the lower end portion of each of the shafts 30 as best shown in Fig. 6 is a horizontal disc 69. These discs 69 are connected by vertically extending pivots 70 to a spaced collar disc 71. Mounted on each of the pivots 70 in free swinging relation is a generally triangularly shaped cutter element or knife 72. These knives 72 are sharpened along both of the side edges and are pivoted at the base of the triangle so that when the disc 69 and the collar 71 rotate rapidly the blades will extend radially therefrom and the forward and the trailing edge thereof will be sharp.

As best shown in Figs. 2 and 3 a bracing structure having the general shape of a parallelogram is provided for maintaining the cutter elements in a susbtantially horizontal position. This bracing structure includes along each side of the frame F a pair of vertically spaced parallel bracing arms, the upper one 73 of which is pivotally secured to the frame F with a plate 74. This upper bracing arm extends diagonally downwardly and outwardly and is pivotally connected at the lower end to an ear 75 on the top of the gear box 28 disposed immediately inwardly of the bracket 34. This is best shown in Fig. 2. The lower 76 of these parallel arms extends downwardly and inwardly and is pivotally connected to the frame F at its upper end by a plate 77 which depends from the frame F. The lower end of the bracing arm 76 is pivotally connected to the lower side of the gear box 24 by a horizontally and forwardly extending pivot bracket 77a.

Wherever herein the term rotary cutter unit is used it is intended to refer to a gear box 28 or 33 in conjunction with its vertical shaft 30, the disk 69, the collar disk 71 and the cutter elements 72. Wherever the term rotary cutter unit assembly is used herein it is intended to connote a plurality of such rotary cutter units connected together into an assembly movable as a single unit. Thus the plurality of rotary cutter units extending laterally from each of the brackets 34 are considered to constitute a lateral extending rotary cutter unit assembly and the plurality of rotary cutter units connected together between the brackets 34 are considered to constitute a centrally and transversely disposed cutter unit assembly.

The cutter elements of the respective rotary cutter units are synchronized with those of the adjacent cutter unit and the units are arranged closely enough together so that the cutter elements overlap. The outermost of the cutter units of each lateral assembly is disposed so that its cutter elements at least intersects the axis of the supporting wheel structure adjacent the outermost wheel 48. This is best shown in Fig. 1.

To facilitate the passage of our rotary mower through gates and other relatively narrow passages and to insure that the respective cutter assemblies will be prevented from bouncing while passing over rough terrain at relatively high speeds, we have provided a combined elevating and depressing mechanism to be used in conjunction with these assemblies. This mechanism has been indicated generally as M and may include as shown a pair of longitudinally spaced inverted V-shaped supports 78 with horizontal arms 78a mounted on top of the frame and extending laterally therefrom. A pivot member 79 is provided and secured at the apex of the V and upon this pivot member is pivotally mounted a pair of oppositely extending hydraulic cylinders 80. These cylinders together may be considered to constitute a hydraulic cylinder assembly and each of them is provided with a piston (not shown) which has a piston rod 81 extending outwardly therefrom. As best shown in Fig. 2 these cylinders 80 are arranged so that the piston rods 81 will extend laterally with respect to the frame F. Each of the rods 81 is provided with a U-shaped bracket 82 at its outer end and this bracket is pivotally connected to a horizontally extending pivot shaft or pin 83 which extends through a pair of spaced pivot arms 84. These pivot arms 84 are pivotally mounted at their lower ends on their respective horizontal support arm 78a. The cylinders 80 are supplied by the motor 15 with a source of hydraulic power (not shown).

Pivotally mounted on the horizontal pivot pin or shaft 83 is a lever arm 85. As best shown in Fig. 2 this lever arm is mounted by one of its end portions and has a disc or drum-like structure 86 formed integrally therewith or fixedly secured thereto. This disc 86 is provided with a groove 87 in its outer circumferential surface. The outer end of the lever arm 85 is pivotally connected with a lift arm 88 which in turn is pivotally connected to an upstanding bracket 89 fixedly secured to the top of a housing 32 as at 90 at a point spaced between the ends of the lateral cutter unit assembly.

A cable 91 is anchored on the outer end portion of each of the arms 78a at a point outside of the pivot points of the lower end of the pivot arms 84. This cable 91 extends upwardly around the disc 86 and within the groove 87 and is secured to the disc itself at a point partway therearound. The cable extends in the direction in which the lever arm 85 will swing when the lateral assembly moves downwardly.

A second cable 92 extends outwardly from each of the ends of a relatively strong contractile type spring 93 which is disposed between the discs 86. Each of these cables 92 extend around the discs 86 in the opposite direction from the cable 91 and is fixedly secured to the disc at a point partway therearound as best shown in Fig. 4. The length of the cables 92 is such that when the lateral assemblies are lowered the spring 93 will necessarily be extended substantially. The length of the cables 91 is such that when pivot arms 84 move to vertical position the respective discs 86 will be caused to rotate about the pivot shaft 83 to cause the outer end of the lever arm 85 to swing upwardly and draw its lift arm 88 and the lateral assembly connected thereto upwardly. These cables 91 are also of such a length that when the structure is in the position shown in Fig. 2 the cables are relaxed.

*Operation*

In operation the embodiment of our invention shown in Figs. 1–10 may be drawn behind a tractor or other propelled vehicle to accomplish the mowing function. Fig. 5 shows diagrammatically the manner in which a 180° turn will be executed with this mower without skipping of unmown areas and without skidding of the wheels supporting the mowing structure. The left hand portion of Fig. 5 shows the multi-rotor mower being drawn in the direction indicated (toward the top of the drawing) and indicates the paths followed by the respective wheels during the turning operation. The right hand wheel which is mounted adjacent the outer end of the right hand laterally extending cutter unit assembly backs up during the turning operation so that when the turn has been completed it is in the position shown in broken lines. The rest of the mower is also shown in broken lines after the turn has been completed. It can be readily seen through reference to the line Y—Y that the completion of the 180° turn results in a substantial overlap by this right hand wheel. Thus there will be absolutely no skipping of unmown areas possible in the vicinity of this right hand wheel. This obviates any requirement for additional turns or additional mowing trips across the ends of the area to be mown to insure that all of the grass and weeds which ordinarily is missed during such turns has been mown.

When a 180° turn is executed as shown in Fig. 5, each of the respective wheels completes the turn without any skidding relative to the surface being mown. This is accomplished as a direct result of each of the supporting wheels being mounted along an axis lying in the same vertical plane as the axis of the wheels supporting the frame F. Close examination of Fig. 5 will reveal that the turning point in such a turning operation is disposed immediately inside of the outermost wheel on the side toward which the turn is being made. Since each of the wheels is continually maintained at all times throughout the turning operation along an axis which is in the same vertical plane as the axis of the frame supporting wheels, it is not necessary for any of the other side supporting wheels to skid or slip sideways in order to complete the turn. Thus there is no skidding or slipping of the wheels or their tires over the surface being mown. Since there is no slipping or skidding, there will be no consequent damage to the surface being mown and there will be no excessive wear on the tires mounted on the wheels executing the turn.

One important feature of our invention is the sweep back arrangement of the rotary cutter units, each of these cutter units being arranged so that the various cutter elements are synchronized and overlap with respect to each other. By arranging the rotary cutter units in a continuous line with such overlapping relation existing therebetween, it is possible to have additional supporting wheels such as the wheels 48 without the objectionable skidding and excessive wear normally encountered since such a sweep back arrangement permits each of such supporting wheels to be mounted along the same axis or at least along an axis in the same vertical plane as the axis for the frame supporting wheels. This sweep back arrangement, of course, could be varied to provide a sweep forward arrangement by placing the central rotary cutter unit assembly rearwardly of the frame supporting wheels 13 and by causing the laterally extending assemblies to extend forwardly to a point where their supporting wheels are disposed along the same axis as the wheels supporting the frame F. Thus we have provided a mower wherein a continuous wide swathe may be accomplished and wherein the mechanism for accomplishing such a wide swathe does not have the objectionable features previously found in mowers attempting to cover such wide strips.

The lever arm 55 in conjunction with the suspension arm 59 and their associated parts cooperate to provide a dampening effect with respect to the vertical movement imposed on the central cutter unit assembly as a result of the frame supporting wheels 13 passing over rough terrain. For example if one of the wheels 13 strikes a bump, the I beam 52 will move upwardly and carry the rearward end of the lever arm 55 upwardly therewith. By referring to Fig. 7 it will be readily seen that the central cutter unit assembly will be caused to move upwardly as a direct result. The upward movement however, is substantially reduced because the suspension arm 59 is attached at approximately the longitudinal mid-section of the lever arm 55. Thus if the rearward end of the lever arm moves upwardly one foot, the suspension arm 59 which is attached to the central rotary cutter unit assembly will be moved upwardly only approximately one-half that distance.

Another result of the use of the lever arm 55 and the suspension arm 59 in conjunction with the spring 59 is that the cutter elements are urged downwardly at all times with respect to the frame while the machine is passing over a bump. When the wheels pass over a bump, the leaf spring 59 is compressed until its resistance is sufficient to bear and lift the weight of the frame. As soon as the wheel passes over the crest of the bump, the leaf spring urges the wheel downwardly. Hence, even though the frame may continue to follow the trajectory given it by the impact of the wheel upon the bump, the cutter elements will be lowered with respect to the frame to off-set such movement and minimize its undesirable consequences. In other words, the frame is indexed to the spring in such a way that when the frame rises, the cutter element is maintained at a low level because the wheel is maintained in contact with the surface of the bump at all times and hence the rearward end of the lever arm 55 is lowered in conformance with the surface over which the wheel passes.

It is possible to adjust the elevation at which the respective cutter elements are disposed above the surface to be mown. This is accomplished by removing the lock pin 64 and adjusting the cushion 62 and collar 63 so that the lock pin will extend through the spacing hole 61 located to provide the desired elevation. In this manner the elevation of the central assembly and the elevation of the inner end portions of the lateral assemblies may be adjusted. The outer end portions of the lateral assemblies may be adjusted through the adjustment of the ratchet arm 41. To accomplish this adjustment the set screw 46 is loosened and the ratchet arm 41 is drawn rearwardly by the means of the handle 42 and raised or lowered to the desired elevation whereupon the ratchet arm is again moved forwardly so that the teeth 45 may engage the pin 44. The set screw 46 is then again tightened to secure the ratchet arm in place.

Bracing structure is required to insure that the shafts 30 within the rotary cutter units are at all times maintained in substantial vertical position despite the vertical movements of the central assembly. By referring to Figs. 3 and 7 it can be readily seen that means must be provided to insure that these shafts 30 will not tilt off their vertical positions. We have provided what we choose to call a parallelogram type of bracing structure. By referring to Fig. 3 it can be readily seen that the central assembly of rotary cutter units is free to move upwardly and downwardly and that it will at all times be prevented from tilting its shafts 30 off vertical position by our novel bracing structure. In other words, since the bracing arms 73 and 76 are parallel and are pivotally connected to the central assembly, these arms will move with the assembly to maintain the same in its proper orientation and will at all times remain parallel to each other When the device is in the position shown in Fig. 2 the laterally extending portions of the pivot arms 84 cause the cables 92 to tension the spring 93. Since the spring pulls inwardly on the cable 92, each of the discs 86 and the lever arms 85 are urged to rotate so that the outer end positions of the lever arms will be urged downwardly to exert a depressing effect on each of the lateral assemblies. In other words, a downwardly directed pressure will be exerted through the lift arms 88 upon each of the lateral assemblies and that urge will remain constant without any pressure whatsoever being exerted by the piston rods 81 of the hydraulic assembly. This downward pressure serves the very useful function of maintaining the outer support wheels in contact with the ground at all times and thus prevents bouncing of the cutter unit assemblies and irregular, unsatisfactory mowing operations. There is a great tendency for bouncing of these cutter units while passing over rough terrain at high speeds and this depressing mechanism effectively prevents such units from such bouncing movement. As a result, the mowed surface has an even and highly satisfactory cut despite the fact that the mowing operation is performed at high speeds.

Because a mower of such wide proportions is utilized, there is need to be able to partly collapse or withdraw the laterally extending portions of the device. This is important since it is often necessary to move such a device through relatively narrow gates or other narrow passageways. It is also important to be able to elevate the cutter units a substantial distance above the ground to permit more rapid transportation of the device when not engaged in cutting or mowing operations. It is obvious, of course, that it is possible for each of the lateral assemblies to pivot vertically about the axis of the pivot pins 35 which connect the brackets 34 and 36. We having provided a combined elevating and depressing mechanism for the purpose of controlling such pivotal movement.

When it is desired to elevate the lateral assemblies, the cylinder assembly may be activated by the motor 15 to draw the pistons and their brackets 82 inwardly. By referring to Fig. 2 it can be seen that the result of this inward movement is to move the pivot shaft 83 both inwardly and upwardly. The inward movement, however, exceeds the upward movement so that the tension on the spring 93 will be relaxed. Since the upward movement of the pivot shaft 83 and its inward movement both tend to move that shaft farther away from the anchor of the cable 91, this movement results in the discs 86 being caused to rotate. The direction of this rotation is such as to cause the outer end portions of the lever arms 85 to swing upwardly, pivoting or swinging around the pivot shafts 83 so that when the pivot arms 84 have reached approximately vertical position, the lateral assemblies will have been elevated a very substantial distance. Once the lateral assemblies have been elevated, they may be maintained in this position by locking the hydraulic assembly in any well known conventional manner.

When it is desired to again lower these lateral assemblies, the hydraulic assembly is actuated by the motor 15 to cause the piston rods 81 to move outwardly. This outward movement will gradually permit the lowering of the assembly to the position shown in Fig. 2 but before reaching that position the tension on the cables 91 will have been relaxed and the tension on the cables 93 will have again been imposed thereupon to provide the downward thrust upon each of the lift arms 88. This constant downward thrust effectively prevents the lateral assemblies from performing an uneven mowing operation as a result of bouncing caused by the passage of the device over rough terrain at relatively high speeds.

We have provided a multi-rotor mower capable of cutting an extremely wide swath and of being operated over relatively rough terrain at speeds approximately as high as 25 miles per hour. It can be readily seen that our mower will perfect a 180° turn without any damage whatsoever to the surface being mown, without any excessive wear upon the tires, and without leaving any unmown portions in the area of the point about which the turn is made. Our mower is constructed to eliminate the marked elevational irregularities in the cutting operation which normally results from mowing at high speeds over rough terrain. This of course is accomplished by our dampening mechanism in combination with our depressing mechanism.

It should be noted that we have provided a mower which eliminates a substantial loss of time by obviating any requirement for changing the knives as soon as the conventional single cutting edge is dulled. We have provided cutting elements with two cutting edges and have provided means for reversing the direction of rotation of the cutter elements so that the second group of cutting edges may be used when the first group of cutting edges has become dulled.

It should also be noted that we have provided novel and improved means for preventing the cutter elements from engaging and throwing foreign objects. This substantially reduces the danger of injury to the operator of the device and to bystanders. Any foreign objects engaged by the knife elements 72 will be tossed against the depending chains 68 and will thereafter be deflected downwardly to fall harmless to the ground. At the same time, these chains 68 permit the grass and weeds to extend upwardly therebetween so as to remain in a relatively upright position at all times prior to the cutting operation. The flexible and separable nature of the plurality of chains effectively prevents any matting of the weeds and grass and consequent raising of the assemblies which might result from the use of a rigid integral guard such as a plate.

It should also be noted that we have completely eliminated any requirement for castored wheels to support the cutter units. Castored wheels, which have been commonly used previously in an attempt to keep skidding at a minimum, are unsatisfactory because they wear excessively when used at high speeds, thereby necessitating frequent replacements and increasing costs of operations substantially. With a sweep-back or sweep-forward arrangement of cutter units, castored wheels are not required and, in fact, are not as satisfactory. A castored wheel, when driven at relatively high speed will "shimmy" violently and will set up extreme vibrations within the entire machine. Such vibrations, of course, are highly undesirable for they increase the wear on the machine parts and prevent it from operating in a satisfactory manner.

Wherever hereinafter the expression "meets the vertical plane" or a similar expression is used with respect to the cutter element orbits and the axis of the ground engaging wheels, it is intended to include structure which conforms substantially with such specification.

It will, of course, be understood that various changes may be made in the form, details, arrangement and proportions of the parts without departing from the scope of my invention.

What we hereby claim is:

1. A rotary mower comprising an ambulant frame supported by ground engaging elements arranged on an axis extending transversely to said frame and a plurality of rotary cutter units connected with said frame and extending laterally outwardly therefrom and having cutter elements mounted for rotation on spaced vertical axes and overlapping the cutter elements of adjacent cutter units, said cutter units being disposed at one side of the axis of the ground engaging elements and positioned along a line extending diagonally relative to said frame, the outermost of said cutter units being positioned substantially at the axis of said ground-engaging elements.

2. A rotary mower comprising an ambulant frame supported by ground engaging elements arranged on an axis extending transversely to said frame, and a plurality of rotary cutter units connected with said frame adjacent each other and each having cutter elements mounted for rotation on spaced vertical axes and overlapping the cutter elements of adjacent cutter units at least some of said cutter units extending in a line generally diagonally and laterally with respect to said frame, the cutter elements of the outermost of said cutter units passing during their rotation immediately adjacent the axis of said ground-engaging elements.

3. A rotary mower comprising an ambulant frame supported by ground engaging elements arranged on a horizontal axis extending transversely to said frame, and a plurality of rotary cutter units adjacent to each other and supported in part at least by said frame and each having cutter elements mounted for rotation on spaced vertical axes and overlapping the cutter elements of adjacent cutter units, at least some of said cutter units being positioned along lines extending generally diagonally and laterally from both sides of said frame, the cutter elements of the outermost of said cutter units passing during their rotation in close proximity to the vertical plane of the axis of said ground-engaging elements but at points removed laterally far from said ground-engaging elements.

4. A rotary mower comprising an ambulant frame having ground engaging elements supporting the same about an axis extending transversely to said frame, a plurality of adjacent rotary cutter units connected with said frame and having cutter elements mounted for rotation about spaced vertical axes to one side of the axis of the ground-engaging elements, said cutter elements during their rotation overlapping the cutter elements of the adjacent cutter unit, at least some of said cutter units being positioned along a line extending diagonally outwardly from said frame to the axis of said ground-engaging elements and forming cutter unit assemblies, the outer end portions of said assemblies being supported by wheel structure having its axis in the same vertical plane as the axis of said ground engaging elements whereby turning operations may be effected without portions of the surface to be mowed being missed by said cutter units.

5. A rotary mower having in combination an ambulant frame supported by ground engaging elements arranged on an axis extending transversely to said frame, and a plurality of rotary cutter units supported adjacent each other and in part at least by said frame and having cutter elements mounted for rotation on spaced vertical axes, said cutter elements overlapping the cutter elements of adjacent cutter units, some of said cutter units extending in a line transversely and centrally of said frame and some other of said cutter units extending in a line generally diagonally and laterally of said frame, each of said cutter units being positioned so that its cutter elements overlap the cutter elements of the adjacent cutter unit, the cutter elements of the most lateral of said cutter units passing during their rotation in close proximity to the same vertical plane as that in which the axis of said ground-engaging elements extends.

6. A rotary mower comprising an ambulant frame supported by ground engaging elements arranged about an axis extending transversely to said frame, a plurality of rotary cutter units supported in part at least by said frame in adjacent side-by-side relationship and each having cutter elements mounted for rotation on spaced vertical axes, the cutter elements of each cutter unit overlapping the cutter elements of the adjacent cutter unit, at least some of said cutter units extending in a line generally diagonally and laterally with respect to said frame, and wheel structure supporting in part at least said diagonally and laterally extending cutter units, the axis of said wheel structure being in the substantially same vertical plane as the transverse axis of said ground engaging elements to positively preclude skidding of said wheel structure during turning operations.

7. A rotary mower comprising an ambulant frame supported in part at least by ground engaging elements arranged about an axis extending transversely to said frame, a plurality of rotary cutter units supported in part at least by said frame and each having cutter elements mounted for rotation on spaced vertical axes, at least some of said cutter units being positioned adjacent each other along a line extending generally diagonally and laterally with respect to said frame, the cutter elements of each of said cutter units overlapping the cutter elements of the adjacent cutter unit and wheel structure apart from said ground engaging elements supporting in part at least said laterally arranged cutter units.

8. A rotary mower comprising an ambulant frame supported in part at least by ground engaging elements arranged about an axis extending transversely to said frame, a plurality of rotary cutter units supported in part at least by said frame and each having cutter elements mounted for rotation on spaced vertical axes, at least some of said cutter units being positioned along a line extending generally diagonally and laterally with respect to said frame and some of said cutter units being positioned along a line extending transversely of said frame, each of said cutter units being disposed closely adjacent to another, the cutter elements of each of said cutter units overlapping the cutter elements of the adjacent cutter unit, and wheel structure apart from said ground engaging elements supporting in part at least said laterally arranged cutter units.

9. A rotary mower comprising an ambulant frame supported by ground engaging elements arranged about an axis extending transversely to said frame, a plurality of rotary cutter units supported in part at least by said frame and each having cutter elements mounted for rotation on spaced vertical axes, at least some of said cutter units being positioned along a line extending generally diagonally and laterally with respect to said frame, and wheel structure apart from said ground engaging elements supporting in part at least said diagonally and laterally arranged cutter units, the axis of said wheel structure being in the same vertical plane as the transverse axis of said ground engaging elements to prevent skidding of said wheel structure during turning operations, all of said cutter units being positioned closely adjacent to each other, the cutter elements of said cutter units overlapping the cutter elements of the adjacent cutter unit, the cutter elements of the outermost of said diagonally and laterally arranged cutter units passing during their rotation through the vertical plane in which the axis of said ground-engaging elements extends.

10. A rotary mower comprising an ambulant frame supported by ground engaging elements arranged about an axis extending transversely to said frame, a plurality of rotary cutter units supported in part at least by said frame adjacent each other and each having cutter elements mounted for rotation on spaced vertical axes, the cutter elements of said cutter units overlapping the cutter elements of the adjacent cutter unit at least some of said cutter units being arranged along a line extending generally diagonally and laterally from both sides of said frame, and wheel structure apart from said ground engaging elements supporting in part at least said diagonally and laterally arranged cutter units, the axis of said wheel structure being in the same vertical plane as the transverse axis of said ground engaging elements to prevent skidding of said wheel structure during turning operations.

11. A rotary mower comprising an ambulant frame supported by ground engaging elements arranged about an axis extending transversely to said frame, a plurality of rotary cutter units supported in part at least by said frame adjacent each other and each having cutter elements mounted for rotation on spaced vertical axes, the cutter elements of said cutter units overlapping the cutter elements of adjacent cutter units, at least some of said cutter units being positioned along a pair of lines extending generally diagonally and laterally with respect to said frame and from both sides thereof and some of said cutter units being disposed centrally of said frame and connecting the inner ends of said pair of lines of cutter units, and wheel structure supporting in part at least said diagonally and laterally arranged cutter units, the axis of said wheel structure being in the same vertical plane as the transverse axis of said ground engaging elements to prevent skidding of said wheel structure during turning operations, the cutter elements of the outermost of said diagonally and laterally arranged cutter units during their rotation intersecting at a point adjacent said wheel structure the vertical plane in which the axis of said ground-engaging elements extend.

12. A rotary mower comprising an ambulant frame supported by ground engaging elements arranged on an axis extending transversely to said frame, a plurality of rotary cutter units supported in part at least by said frame adjacent each other and each having cutter elements mounted for rotation on spaced vertical axes, some of said cutter units being positioned along a line extending transversely of said frame and some of said cutter units being positioned along a line extending generally diagonally and laterally from said frame, the cutter elements of said cutter units overlapping the cutter elements of the adjacent cutter unit and wheel structure apart from said ground engaging elements supporting in part at least said diagonally and laterally arranged cutter units, the axis of said wheel structure being in substantially the same vertical plane as the transverse axis of said ground engaging elements to positively preclude skidding of said wheel structure during turning operations.

13. The structure defined in claim 12, the cutter elements of the outermost of said diagonally and laterally arranged cutter units passing during their rotation beneath the axis of said ground-engaging elements and closely adjacent to said wheel structure.

14. A rotary mower comprising an ambulant frame supported by ground engaging elements arranged on an axis extending transversely to said frame, a plurality of rotary cutter units supported in part at least by said frame and each having cutter elements mounted for rotation on spaced vertical axes, some of said cutter units being arranged into a transversely extending cutter unit assembly and the remainder of said cutter units being arranged into two cutter unit assemblies extending laterally and diagonally from the ends of said transverse cutter unit assembly, and wheel structure supporting in part at least said laterally extending cutter unit assemblies, the axes of said wheel structure being in the same vertical plane as the transeverse axis of said ground engaging elements to prevent skidding of said wheel structure during turning operations, each of said cutter units being disposed closely adjacent another, the cutter elements of said cutter units overlapping the cutter elements of the adjacent cutter unit, the cutter elements of the outermost cutter unit of said laterally exending assemblies intersecting at a point adjacent said wheel structure the vertical plane in which the axis of said ground-engaging elements extends whereby sharp turning operations may be effected without skidding of said wheel structure and without portions of the surface to be mowed being missed by said cutter units.

15. A rotary mower comprising an ambulant frame supported by ground engaging elements arranged on an axis extending transversely with respect to the direction of movement of said frame, a transversely arranged cutter unit assembly supported in part at least by said frame and including a plurality of rotary cutter units mounted adjacent each other and each having cutter elements mounted for rotation on spaced vertical axes, said assembly extending substantially parallel to the axis of said ground engaging elements, a pair of auxiliary cutter unit assemblies connected to the opposite ends of said transversely arranged assembly and being comprised of rotary cutter units similar to those in said transverse assembly and each extending laterally and diagonally from said ends at least to a point where the cutter elements of the outermost of its rotary cutter units intersects the vertical plane in which the axis of said ground engaging elements extends, the cutter elements of said cutter units overlapping the cutter elements of the adjacent cutter unit and wheel structure connected to said auxiliary assemblies and supporting in part at least the outer end portions of said auxiliary assemblies, the axis of said wheel structure being in substantially the same vertical plane as the axis of said ground engaging elements.

16. A rotary mower comprising an ambulant frame supported by ground engaging elements arranged on an axis extending transversely to said frame, a transversely arranged cutter unit assembly supported in part at least by said frame and including at least one rotary cutter unit having cutter elements mounted for rotation on a vertical axis, a pair of auxiliary cutter unit assemblies pivotally connected for vertical swinging movement to opposite end portions of said transversely arranged assembly and each extending laterally therefrom and toward the axis of said ground engaging elements at least to a point where the cutter elements of the outermost of the cutter units comprising said auxiliary assemblies meets substantially the vertical plane of the axis of said ground engaging elements, the cutter units of said assemblies being positioned closely adjacent to each other and the cutter elements of each overlapping the cutter elements of the adjacent cutter unit and wheel structure supporting in part at least said laterally extending cutter unit assemblies, the axis of said wheel structure being in substantially the same vertical plane as the transverse axis of said ground engaging elements to positively preclude skidding of said wheel structure during turning operations.

17. In a rotary mower having an ambulant frame supported by wheel structure arranged on an axle extending transversely to such frame and having a plurality of connected rotary cutter units mounted thereon and capable of vertical movement as a unit, cutter unit suspension mechanism comprising a support arm having one of its end portions pivotally connected to such axle and having its other end portion pivotally connected to such frame a substantial distance from the axle, and connector means disposed between the medial portion of said support arm and the cutter units and interconnecting the same whereby such cutter units will be moved vertically substantially less than the corresponding vertical movement of the axle while the mower is traversing rough terrain.

18. A guard device for use in conjunction with mower housings enclosing rotary cutter units, said guard device being comprised of a plurality of closely spaced flexible guard elements mounted upon such housing ahead of and behind the rotary cutter unit enclosed by the housing, said guard elements depending from the housing to substantially the same plane as the lowermost portion of the cutter unit to effectively prevent stones and other foreign objects engaged by the cutter unit from being thrown a substantial distance and causing injury to individuals in the vicinity thereof and to nevertheless provide free access of weeds and grass to said cutter elements.

19. A rotary mower comprising an ambulant frame supported by ground-engaging elements arranged on an axis extending transversely with respect to the direction of movement of said frame, a cutter unit assembly extending transversely of said frame and including a plurality of rotary cutter units mounted adjacent each other, each of said rotary cutter units having cutter elements mounted for rotation on spaced vertical axes, a pair of auxiliary cutter unit assemblies connected to the opposite ends of said transversely arranged cutter unit assembly and being comprised of rotary cutter units similar to those in said transverse assembly, each of said auxiliary cutter unit assemblies extending laterally and diagonally from the ends of said transversely extending cutter unit assemblies to a point where the cutter elements of the outermost of its rotary cutter units intersect the vertical plane in which the axis of said ground-engaging element extends, the cutter elements of each of said cutter units overlapping the cutter elements of the adjacent cutter unit, said auxiliary cutter unit assemblies being connected to and supported in part at least by said frame, and wheel structure connected to said auxiliary assemblies and supporting in part at least the outer end portions of said auxiliary assemblies, the axis of said wheel structure being in substantially the same vertical plane as the axis of said ground-engaging elements, said auxiliary cutter unit assemblies comprising the sole support for said transversely extending cutter unit assembly.

References Cited in the file of this patent

UNITED STATES PATENTS

| Number | Name | Date |
| --- | --- | --- |
| 851,901 | Sherrard | Apr. 30, 1907 |
| 1,233,134 | Shuttleworth | July 10, 1917 |
| 1,397,365 | Cook | Nov. 15, 1921 |
| 1,693,475 | Clapper | Nov. 27, 1928 |
| 1,710,749 | Svengsgaard | Apr. 30, 1929 |
| 2,066,537 | Murphy | Jan. 5, 1937 |
| 2,141,806 | Zielesch | Dec. 27, 1938 |
| 2,243,133 | Steiner et al. | May 27, 1941 |
| 2,483,683 | Wells et al. | Oct. 4, 1949 |
| 2,564,586 | Smith et al. | Aug. 14, 1951 |

FOREIGN PATENTS

| Number | Country | Date |
| --- | --- | --- |
| 512,538 | France | Oct. 16, 1920 |
| 709,841 | France | May 26, 1931 |